Figure 1:
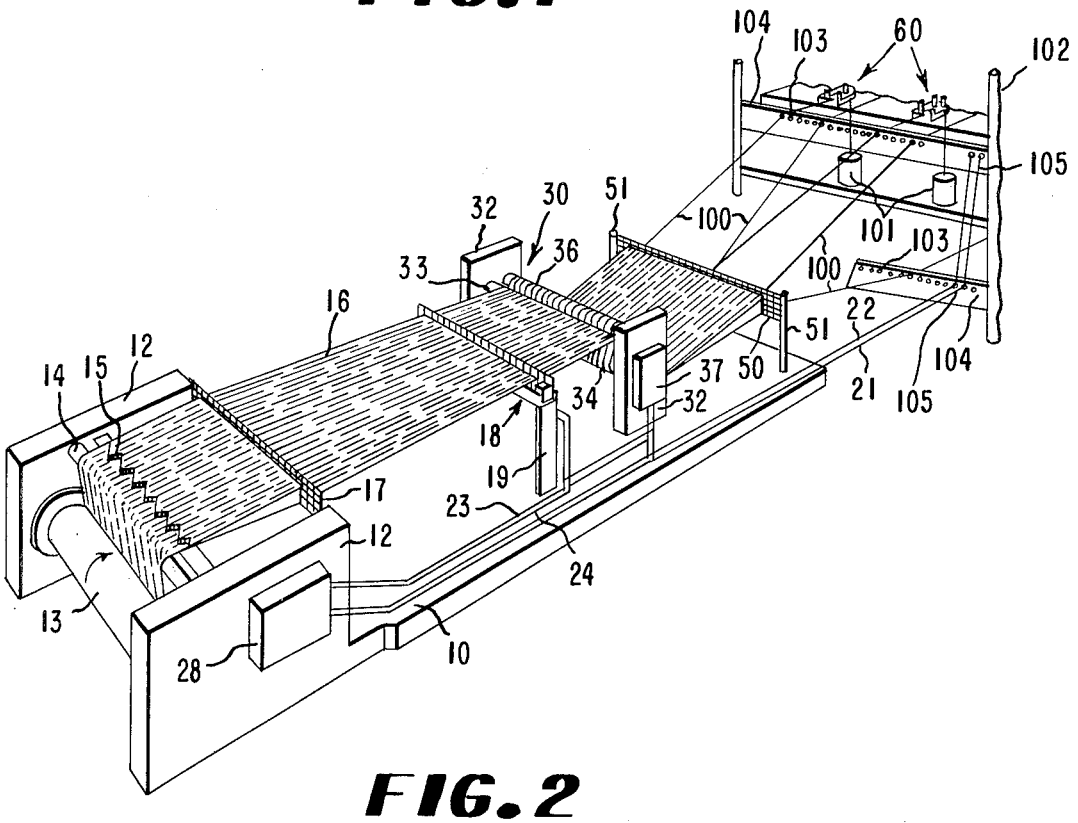
Figure 2:
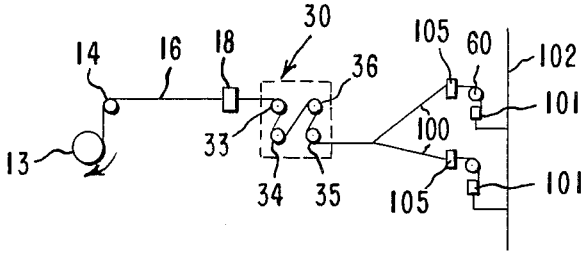

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 5, 1976

951 O.G. 8

T951,010

YARN BEAMING PROCESS

Edward Raymond Bradley, 7121 Cherokee Road
Richmond, Va. 23225

Filed Nov. 24, 1975, Ser. No. 634,439
Int. Cl.[2] D02H *13/08*
U.S. Cl. 28—72.5
1 Sheet Drawing. 9 Pages Specification

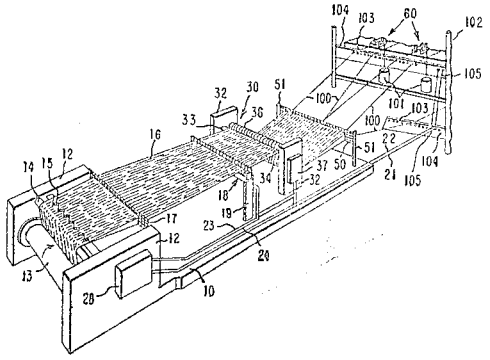

Yarn beaming speeds are limited by the need to brake the beam and the warp sheet of threads being wound on the beam when a defect in the warp sheet is encountered to prevent slack from forming in the warp sheet or a defect from being wound onto the beam. It has been discovered that beaming speeds can be increased above former levels by the use of yarn driven rolls between the beamer and the yarn supply creel. Whenever the beam is stopped, the yarn driven idler rolls are braked to a substantially instantaneous stop. The friction of the yarn on the surface of the idler rolls brakes the forward movement of the warp sheet.